United States Patent
Zhu et al.

(10) Patent No.: US 7,406,941 B2
(45) Date of Patent: Aug. 5, 2008

(54) ONE PIECE CAST STEEL MONOBLOC PISTON

(75) Inventors: Xiluo Zhu, Ann Arbor, MI (US); Eduardo Hiroki Matsuo, Ann Arbor, MI (US)

(73) Assignee: Federal - Mogul World Wide, Inc., Southfield, MI (US)

( * ) Notice: Subject to any disclaimer, the term of this patent is extended or adjusted under 35 U.S.C. 154(b) by 38 days.

(21) Appl. No.: 11/185,413

(22) Filed: Jul. 20, 2005

(65) Prior Publication Data

US 2006/0037471 A1  Feb. 23, 2006

Related U.S. Application Data

(60) Provisional application No. 60/589,779, filed on Jul. 21, 2004.

(51) Int. Cl.
    *F01P 1/04* (2006.01)
(52) U.S. Cl. .................................. 123/193.6
(58) Field of Classification Search ............. 123/193.6, 123/41, 35; 92/185, 186, 237
    See application file for complete search history.

(56) References Cited

U.S. PATENT DOCUMENTS

| | | | |
|---|---|---|---|
| 2,195,552 A * | 4/1940 | Alexandrescu .................. 92/4 |
| 2,257,184 A | 9/1941 | Nelson | |
| 2,865,348 A * | 12/1958 | Wilhelm et al. .......... 123/41.35 |
| 3,066,002 A | 11/1962 | Rudkin, Jr. | |
| 3,104,922 A | 9/1963 | Baster | |
| 3,324,772 A | 6/1967 | Wittstock | |
| 3,413,897 A | 12/1968 | Atkin | |
| 3,425,323 A | 2/1969 | Hill et al. | |
| 3,703,126 A | 11/1972 | Haug | |
| 3,709,109 A | 1/1973 | Howe | |
| 3,738,335 A | 6/1973 | Hoffmann | |
| 4,206,726 A | 6/1980 | Johnson, Jr. et al. | |
| 4,361,181 A | 11/1982 | Wischnack et al. | |
| 4,428,330 A | 1/1984 | Shimizu | |
| 4,502,422 A * | 3/1985 | Brann ..................... 123/41.35 |
| 4,559,685 A | 12/1985 | Hara et al. | |
| 4,581,983 A * | 4/1986 | Moebus ....................... 92/186 |
| 4,586,553 A | 5/1986 | Allen et al. | |
| 4,662,319 A | 5/1987 | Ayoul | |
| 4,702,151 A * | 10/1987 | Munro et al. ................. 92/237 |

(Continued)

FOREIGN PATENT DOCUMENTS

DE  243530 A1  3/1987

(Continued)

OTHER PUBLICATIONS

Erich Wacker and Wilfried Sander, Piston Design for High Combustion Pressures and Reduced Heat Rejectio to Coolant.

(Continued)

*Primary Examiner*—M. McMahon
(74) *Attorney, Agent, or Firm*—Robert L. Stearns; Dickinson Wright PLLC

(57) ABSTRACT

A piston for diesel engine applications has a piston body cast entirely of one piece of steel and includes a piston head with a combustion bowl, a ring belt and an oil cooling gallery. A pair of pin bosses and a piston skirt are cast as one piece with the piston head out of the same steel material.

14 Claims, 4 Drawing Sheets

U.S. PATENT DOCUMENTS

| | | | |
|---|---|---|---|
| 4,776,075 A | 10/1988 | Kawabata et al. | |
| 4,870,733 A | 10/1989 | Kawabata et al. | |
| 4,890,543 A | 1/1990 | Kudou et al. | |
| 4,891,875 A | 1/1990 | Soichi et al. | |
| 4,939,984 A | 7/1990 | Fletcher-Jones | |
| 4,989,559 A * | 2/1991 | Fletcher-Jones | 123/193.6 |
| 5,014,658 A | 5/1991 | Hara et al. | |
| 5,595,145 A | 1/1997 | Ozawa et al. | |
| 5,601,010 A | 2/1997 | Sawada et al. | |
| 5,713,262 A | 2/1998 | Sugiyama et al. | |
| 5,737,838 A | 4/1998 | Niimi et al. | |
| 5,771,776 A | 6/1998 | Itoh | |
| 5,778,533 A | 7/1998 | Kemnitz | |
| 5,947,065 A | 9/1999 | Bing et al. | |
| 5,979,391 A | 11/1999 | Ulrich et al. | |
| 6,035,923 A | 3/2000 | Oda et al. | |
| 6,314,933 B1 | 11/2001 | Iijima et al. | |
| 6,334,385 B1 | 1/2002 | Wilksch et al. | |
| 6,491,013 B1 | 12/2002 | Gaiser et al. | |
| 6,557,457 B1 | 5/2003 | Hart et al. | |
| 6,557,514 B1 * | 5/2003 | Gaiser | 123/193.6 |
| 6,691,666 B1 * | 2/2004 | Berr et al. | 123/193.6 |
| 6,698,391 B1 | 3/2004 | Kemnitz | |
| 2003/0079709 A1 | 5/2003 | Han | |
| 2003/0154947 A1 | 8/2003 | Han | |
| 2004/0055460 A1* | 3/2004 | Kohnert | 92/85 |
| 2004/0094034 A1 | 5/2004 | Oversby et al. | |
| 2004/0129243 A1 | 7/2004 | Robelet | |
| 2004/0144247 A1 | 7/2004 | Zhu et al. | |
| 2005/0072386 A1 | 4/2005 | Gabriel et al. | |

FOREIGN PATENT DOCUMENTS

| | | |
|---|---|---|
| DE | 3735590 | 1/1989 |
| EP | 0295481 A2 | 12/1988 |
| EP | 1 612 395 A1 | 1/2006 |
| JP | 57108408 A | 7/1982 |
| JP | 60072639 A | 4/1985 |
| JP | 60166158 A | 8/1985 |
| JP | 60206957 A | 10/1985 |
| JP | 60227964 A | 11/1985 |
| JP | 61001446 A | 1/1986 |
| JP | 61190150 | 8/1986 |
| JP | 61190150 A | 8/1986 |
| JP | 01075163 A | 3/1988 |
| JP | 63224858 A | 9/1988 |
| JP | 01267345 A | 10/1989 |
| JP | 02255265 A | 10/1990 |
| JP | 05187313 A | 7/1993 |
| JP | 06280676 A | 10/1994 |
| WO | WO 2004/094808 | 11/2004 |
| WO | WO2004/094808 A1 | 11/2004 |

OTHER PUBLICATIONS

W.J. Morgan, Finite Element Analysis of Steel Pisotn for Hino P11C Engine, AE Goetze Special Products LTD, Sep. 5, 1995.

R. Munro, F. Dubois, P. Matteoda, Ferrous Diesel Pistons for Highway Application, T&N Technology for the 90's, Paper No. 17, Copyright 1990.

R. Munro, R.A. Day, J.R. Parkin, Paper No. 7—The Development of a Lightweight Steel Piston, T& N Technical Symposium 1986.

* cited by examiner

ONE PIECE CAST STEEL MONOBLOC PISTON

This application claims priority to U.S. Provisional Patent Application No. 60/589,779, filed Jul. 21, 2004.

TECHNICAL FIELD

This invention relates generally to heavy duty pistons for diesel engines, and more particularly to monobloc pistons manufactured with an integrated skirt and an oil cooling gallery in the head of the piston.

RELATED ART

Monobloc pistons for heavy duty piston applications are known to the industry and characteristically include an upper piston head portion formed with an outer ring belt region surrounding a recessed combustion bowl region and formed with an annular oil cooling gallery between the ring belt and combustion bowl in which cooling oil is fed to cool the upper portion of the piston during operation. Such pistons are further formed with a pair of laterally spaced pin bosses featuring aligned bores for receiving a wrist pin to couple the piston to a connecting rod. The pin bosses are provided in the lower portion of the piston beneath the head. Monobloc pistons further include a piston skirt region which is formed as one-piece with the pin bosses so as to be immovable relative to the pin bosses, as opposed to an articulated style piston in which the skirt is separately formed and coupled for articulated movement to the pin bosses through the wrist pin.

Monobloc pistons are traditionally made as either a one-piece casting of aluminum or cast iron, or as a two or more piece construction from various materials including iron and steel which are cast and/or forged and subsequently united to provide a one-piece joined structure through various means including bolting, brazing, or welding. The intricacy of the various passages and recesses, and in particular the cooling gallery regions, has restricted the choice of materials to aluminum or cast iron. The multipiece joined structure has the advantage of dividing the piston structure into discrete parts which can be individually manufactured and then joined to unite the parts. The typical multipart monobloc piston is divided across a parting line that passes through the oil cooling chamber. In this way, part of the cooling chamber is formed in the upper head or "upper crown" section, and the remaining part of the cooling chamber is formed in the lower pin boss or "lower crown" section. The upper crown is often cast of steel and is united across the parting line to the lower crown which is sometimes forged of iron. Steel has a higher modulus of elasticity than that of iron and thus has advantages for use in the upper crown section which is subjected to heat and cyclic loading of combustion. There has been little motivation to form the lower crown from other than forged cast iron since the lower crown is not exposed to the level of heat and loading as that of the upper crown.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
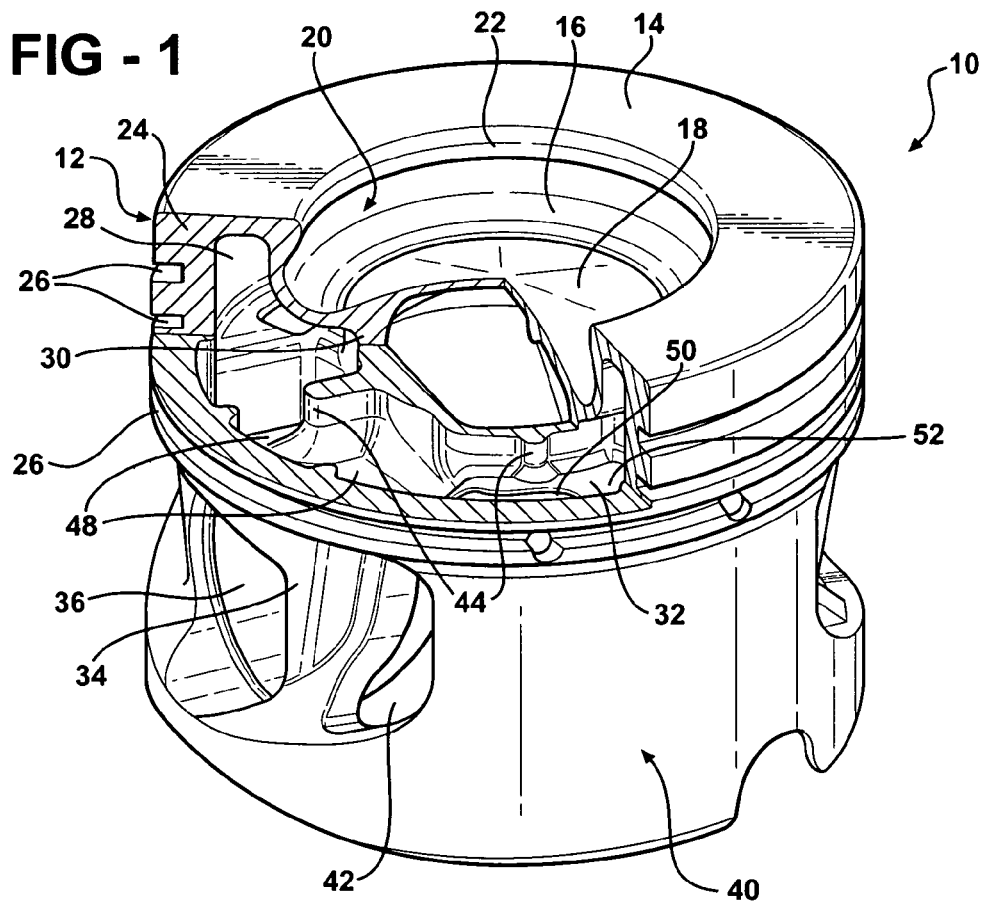
FIG. 1 is a perspective view, shown partly broken away, of a piston constructed according to a presently preferred embodiment of the invention.
Figure 2:
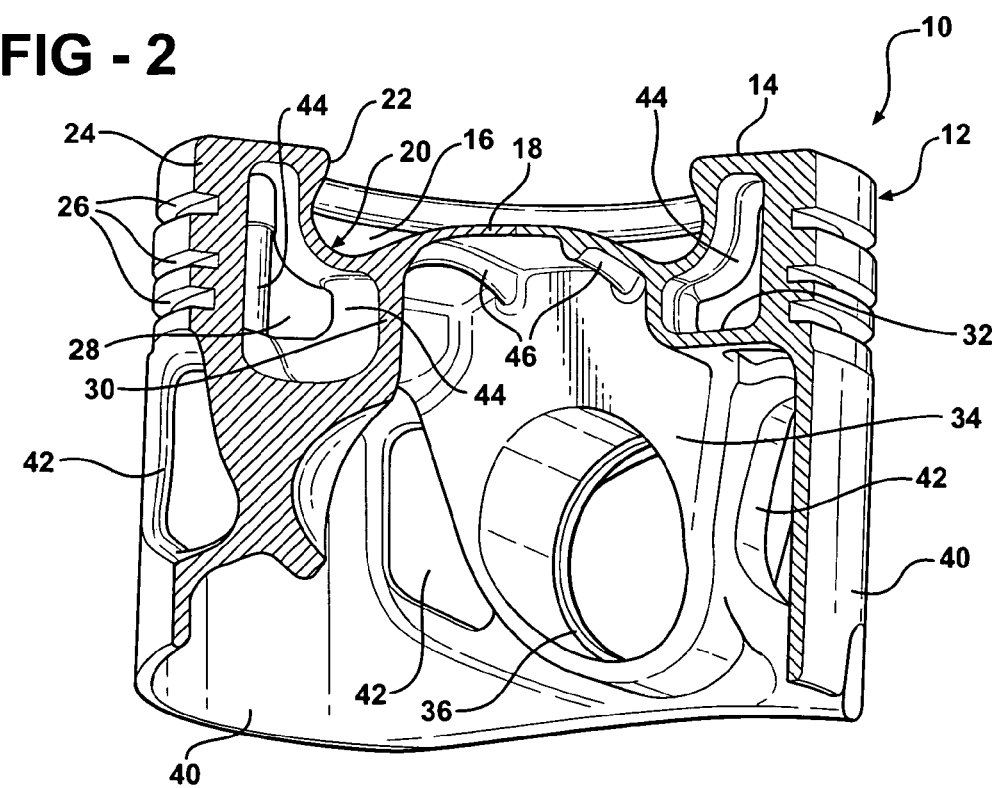
FIG. 2 is a perspective view of the piston of FIG. 1, shown from another angle and partly broken away.
Figure 3:
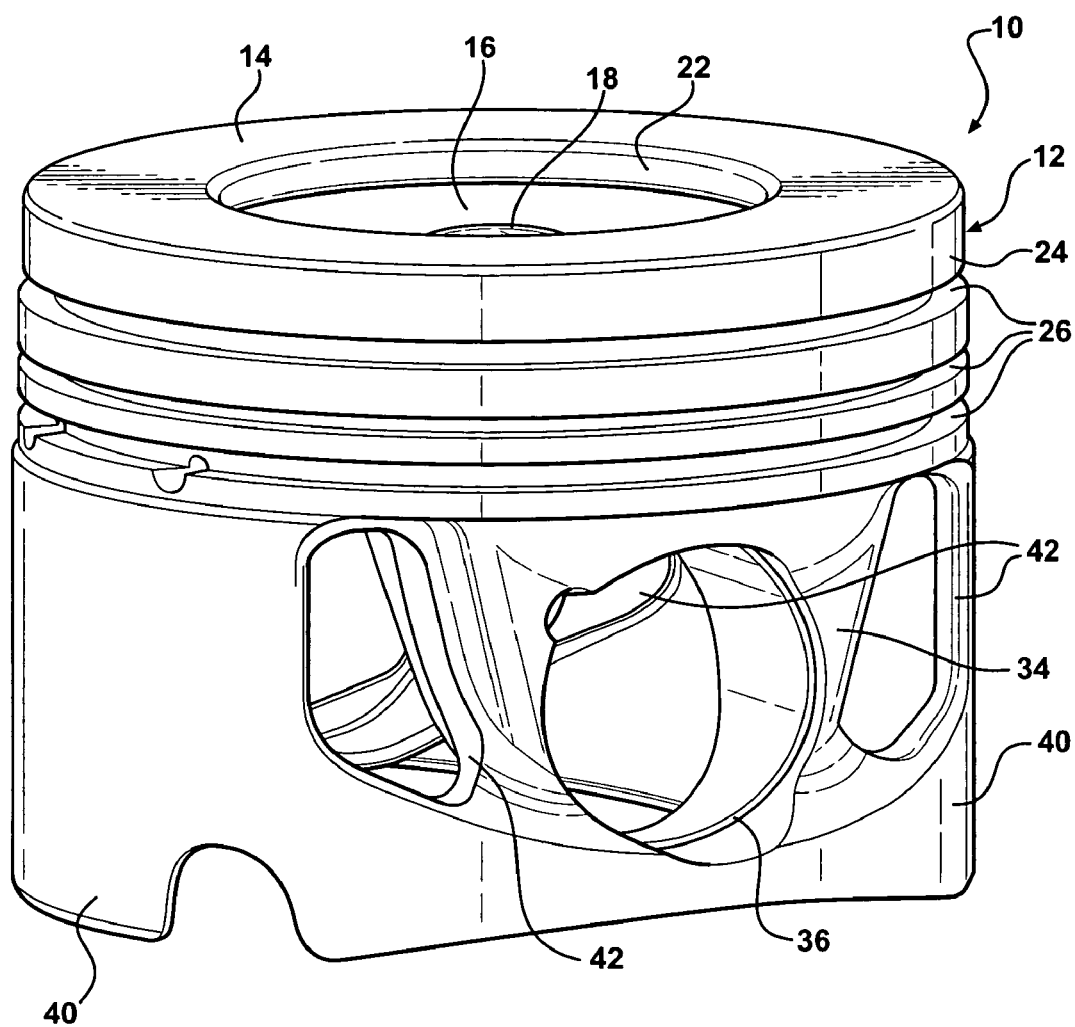
FIG. 3 is a perspective view of the piston of FIG. 1 from a different angle.
Figure 4:
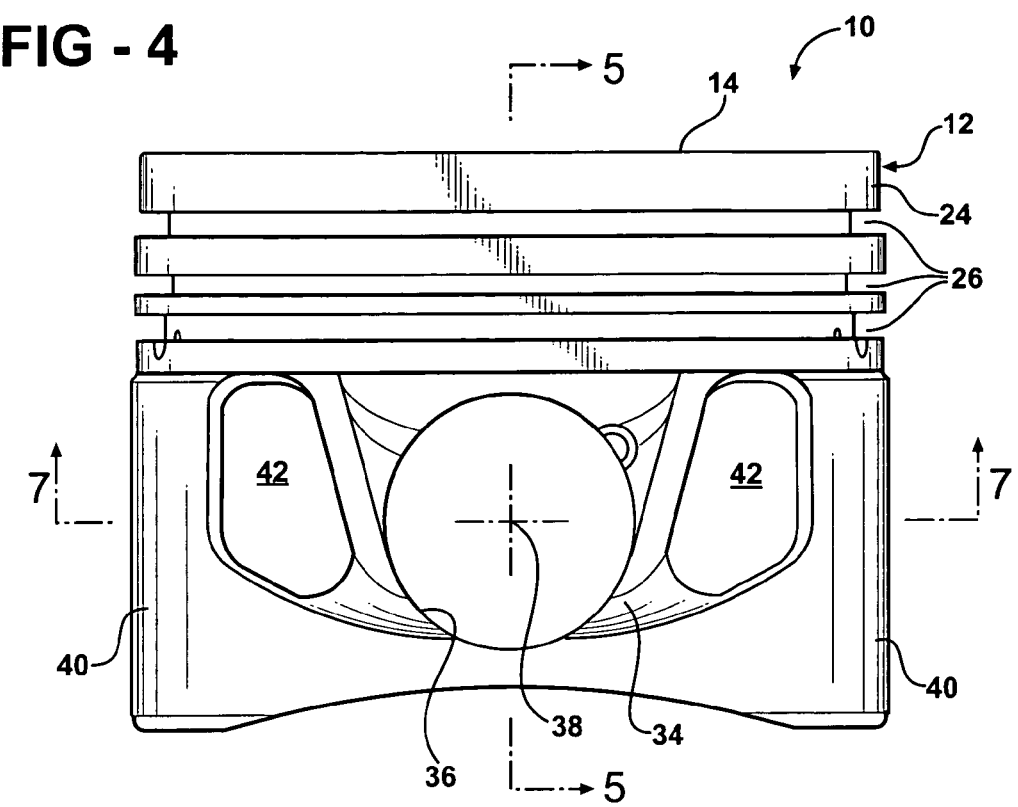
FIG. 4 is a plan view of the piston.
Figure 5:
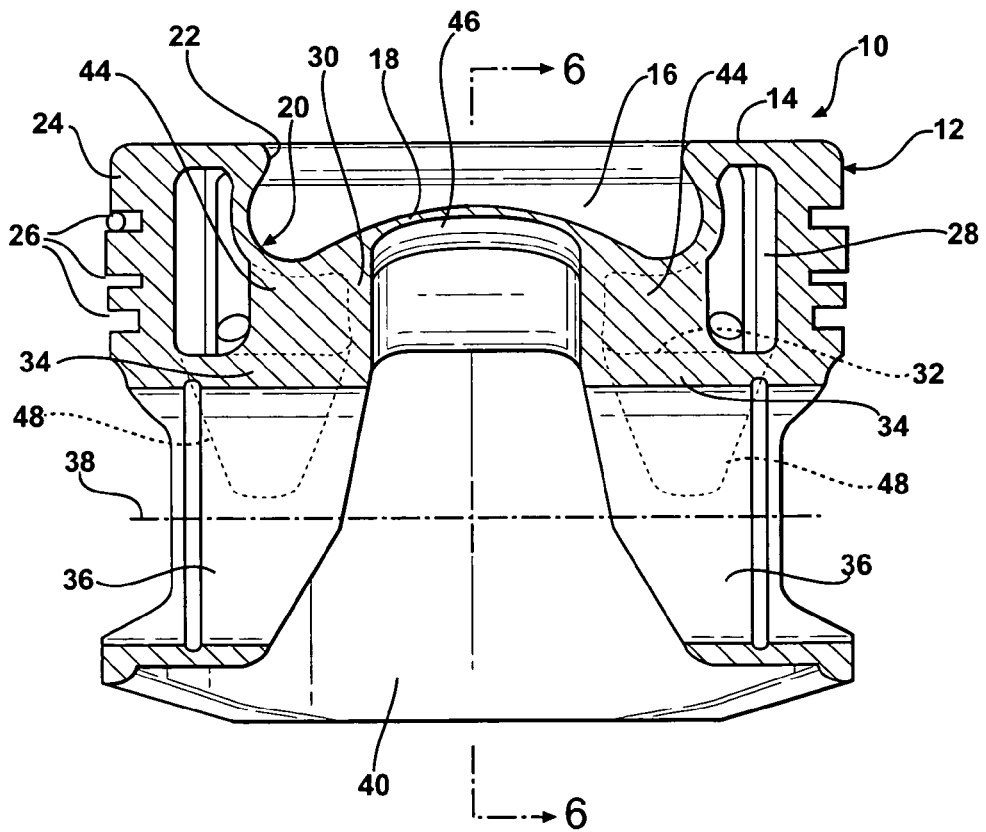
FIG. 5 is a cross-sectional view taken along lines 5-5 of FIG. 4.
Figure 6:
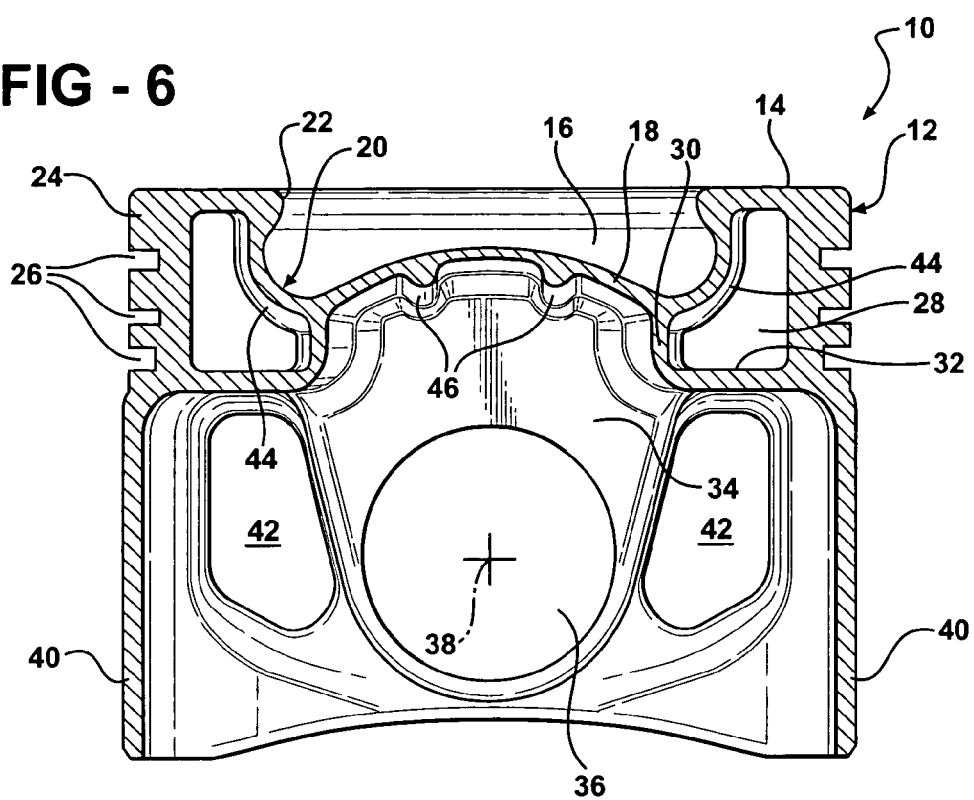
FIG. 6 is a cross-sectional view taken along lines 6-6 of FIG. 5.

A piston constructed according to an embodiment of the invention is shown generally at 10 in the drawings. The piston is of a monobloc construction and cast entirely of one piece of steel, and preferably of SAE 4140H steel. The piston has an upper head portion 12 formed with an upper wall 14 that is generally planar and includes a combustion bowl 16 recessed into the upper wall 14 and bounded by a contoured combustion bowl wall 18 that includes an undercut corner region 20 that extends radially outwardly of an upper lip 22 of the combustion bowl 16 to provide a reentrant structure to the combustion bowl 16. Inward of the undercut region 20, the combustion bowl wall 18 is dome-shaped, with the center of the dome-shaped wall 18 rising above the under cut region 20 toward the upper wall 14, but terminating below the lip 22.

The head portion 12 further includes an outer annular ring belt wall 24 that extends downwardly from the upper wall 14 and is formed with a plurality of ring grooves 26 that are either cast into the ring belt and then machined, or formed entirely by machining following casting. The ring grooves 26 accommodate a corresponding plurality of piston rings (not shown) as is conventional.

The head portion 12 is formed with an as-cast oil cooling gallery 28 inward of the ring belt 24 and below the combustion bowl 16. The oil cooling gallery 28 has an outer annular wall defined by the ring belt 24 and, an upper wall defined by the undercut region 20 of the combustion bowl wall 18. An inner annular wall 30 of the gallery 28 is spaced radially inwardly of the ring belt 24 and extends downwardly from the combustion bowl wall 18 at a location radially inwardly of the undercut region 20. The ring belt 24 is relatively thicker than that of the inner annular wall 30, and the inner annular wall is, in turn, relatively thicker than that of the combustionable bowl 18.

The oil cooling gallery 28 includes a bottom wall or floor 32 which extends between the ring belt 24 and inner annular wall 30 to partially close the oil cooling gallery 28 to the bottom, as will be described in further detail below.

The piston further includes a pair of laterally spaced pin bosses 34 that are cast as one piece with the head portion 12 and which project downwardly from the bottom wall 32 of the head portion. The pin bosses 34 are cast with a set of pin bores 36 aligned along a pin axis 38 for receiving a wrist pin (not shown) for connection of the piston 10 to a connecting rod (not shown) in the usual manner.

The piston 10 is further formed with a piston skirt 40 which is cast as one piece with the head portion 12 and pin bosses 34. This skirt 40 is connected to both the ring belt 24 and the pin bosses 34 and is otherwise unsupported. The skirt 40 is formed with a set of windows or openings 42 that are cast into the skirt 40 on laterally opposite sides of each of the pin bosses 34, for a total of four such windows 42. The windows 42 eliminate material mass and thus reduce the overall weight of the piston in areas where the skirt is not needed.

Turning back to the oil cooling gallery 28, it will be seen that the relatively thin-sectioned inner annular wall 30 and undercut region 20 of the combustion bowl wall 18 are formed with reinforcement ribs 44 to provide locally thickened wall regions to enhance the structural rigidity of the wall portions to withstand the forces of combustion while minimizing the wall thickness in the adjacent unribbed regions to account for an overall reduction in weight of the piston. It will be seen that the ribs 44 extend behind the ring belt 24 and only partially into the oil gallery 28 and thus do not close off the gallery in the circumferential direction such that the gallery remains open and continuous in the circumferential direction. The size of the ribs 44 vary, with the thickest of the ribs lying over the pin bosses 34 in line with the pin axis 38 as shown best in FIG. 1.

Ribs 46 are also provided on the underside of the combustion bowl wall 18 radially inward of the inner wall 30 to strengthen the otherwise thin wall structure of the combustion bowl wall 18 in the dome region.

The pin bosses 34 are formed with hollowed regions or pockets 48 forming a generally saddle-shaped chamber extending below the bottom wall 32 as an extension of the oil cooling gallery 28 in order to reduce material mass and allow cooling oil to drain from the oil cooling gallery 28 into the hollowed regions 28 of the pin bosses 34. The hollowed regions 48 extend down into the pin bosses 34 on either side of the pin bores 36 and terminate short of the pin axis 38. The bottom wall 32 is absent in the hollowed region areas 48 such that there is direct open communication with the oil cooling gallery 28.

Figure 7:
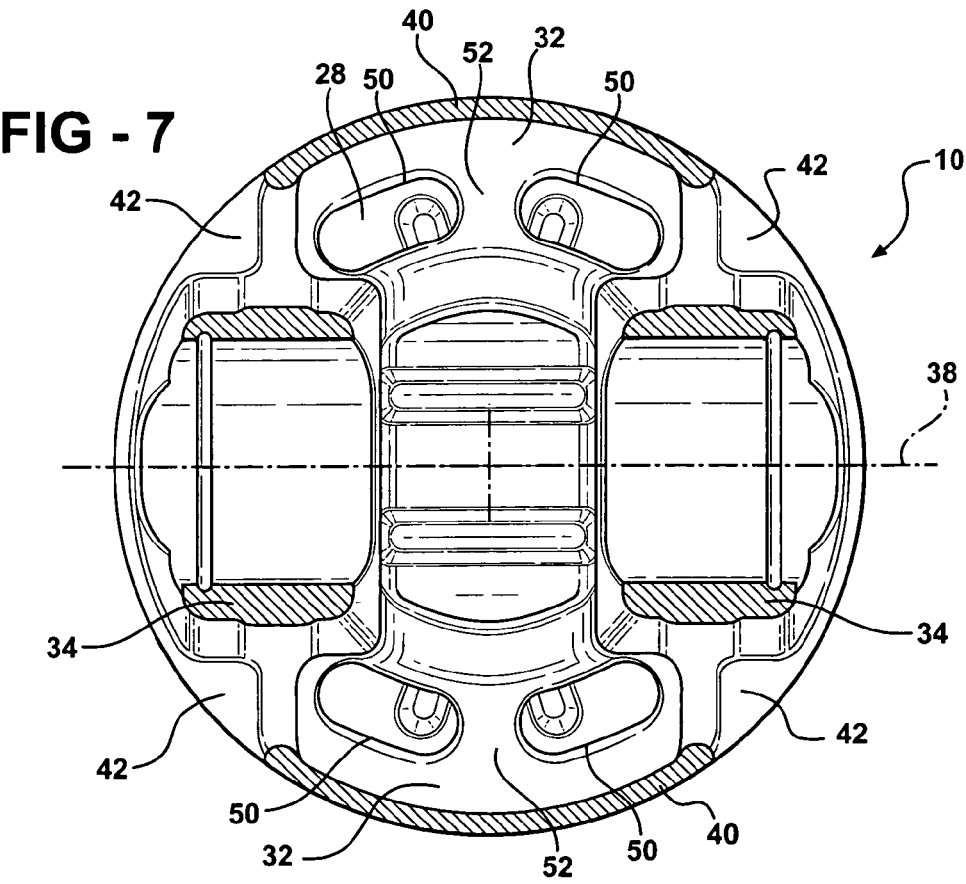
FIG. 7 is a cross-sectional view taken along lines 7-7 of FIG. 4.

In the regions between the pin bosses 34, the bottom wall 32 is preferably formed with at least one and preferably a plurality of openings 50. The openings 50 allow the oil cooling gallery and the various associated hollowed regions and ribs inside the gallery to be formed during casting by means of a casting core which, following casting, can be removed completely through the openings 50. In addition, the openings 50 contribute to a reduction in overall mass of the piston 10. As shown best in FIG. 7, there are preferably four such openings, each pair of openings being separated by an intervening ridge section of the bottom wall 32, although the invention contemplates elimination of the bridge 52 from one or both of the sets of openings, if desired. The openings 50 further serve to provide access to the oil cooling gallery 28 for feeding cooling oil into the piston during operation and to allow, at least in part, for the escape of oil from the gallery. As seen best in FIGS. 1 and 7, the openings 50 are spaced radially from the inner and outer walls 30, 24 and are oblong in shape. The opening 50 is also shown as extending in the circumferential direction across the bottom wall between the pin bosses 34 to such an extend that the oil gallery 28 is rendered more open than closed in the circumferential direction across the bottom wall 32 between the pin bosses 34. In other words, the oblong openings 50 are long enough relative to the overall length of the bottom wall 32 such that the oil gallery 28 is more than 50% open in the circumferential direction across the bottom wall 32. The hollowed regions 48 may also include oil escape holes (not shown) for providing lubrication to the pin bores 36 and/or to the inner faces of the pin bosses 34 to enhance lubrication with the wrist pin and connecting rod interface.

The piston is preferably cast from 4140H steel. Although not limited to a particular process, the piston may be cast using slow-fill counter gravity casting techniques which enables steel, which is otherwise prone to solidification, shrinkage and porosity, to be cast in complex thin-walled sections with intricate features, as are presenting the piston 10, without forming unacceptable levels of porosity and solidification defects in the resultant casting.

Obviously, many modifications and variations of the present invention are possible in light of the above teachings. It is, therefore, to be understood that within the scope of the appended claims, the invention may be practiced otherwise than as specifically described.

What is claimed is:

1. A piston comprising:
   a piston head having a combustion bowl wall, an outer annular ring belt an inner annular wall, an annular oil gallery and an oil gallery floor;
   a pair of pin bosses depending from said piston head having aligned pin bores;
   a piston skirt;
   said piston head, said pin bosses and said piston skirt are cast as a single piece of steel and including a plurality of ribs extending from said outer annular ring belt and from said inner annular wall into said oil gallery above said oil gallery floor, and including further ribs extending along an underside of said combustion bowl radially inwardly of said oil gallery.

2. The piston of claim 1 wherein said oil gallery floor is cast as one piece from said steel.

3. The piston of claim 2 including at least one opening cast in said oil gallery floor.

4. The piston of claim 1 wherein said ribs extend from said underside surface of said combustion bowl wall along said inner annular wall.

5. The piston of claim 4 including a plurality of ribs extending along an underside surface of said combustion bowl wall radially inwardly of said inner annular wall.

6. The piston of claim 1 wherein said pin bosses includes hollow regions communicating with said oil gallery.

7. The piston of claim 6 wherein said hollow regions are saddle-shaped and extend below said floor of said oil gallery into said pin bosses on either side of a pin bore formed in each of the pin bosses.

8. The piston of claim 4 wherein said inner annular wall is thinner in cross-section than that of said ring belt.

9. The piston of claim 8 wherein said inner annular wall is relatively thicker in cross section than that of said combustion bowl wall.

10. The piston of claim 1 including at least one window cast in said piston skirt.

11. The piston of claim 10 including four of said windows.

12. The piston of claim 1 wherein said ribs extending into said oil gallery vary in radial thickness.

13. The piston of claim 12 wherein the thickest of said ribs lie over said pin bosses in line with said pin bore axis.

14. A piston, comprising:
   a piston head having an upper wall, a combustion bowl wall recessed in said upper wall and forming an associated combustion bowl, an outer annular ring belt wall extending downwardly from said upper wall, an inner annular wall spaced radially inwardly from said outer annular ring belt wall and extending downwardly from said combustion bowl wall, and a bottom wall extending between and interconnecting said outer annular ring belt wall and said inner annular wall and at least partially enclosing an annular cooling galley, each of said walls having a thickness and wherein the thickness of said outer ring belt wall is greater than the thickness of said inner annular wall, which in turn is greater than the thickness of said combustion bowl wall;

a pair of pin bosses depending from said piston head and having pin bores aligned along a common pin bore axis, said pin bosses being partially recessed such that said oil gallery extends down into hollowed regions of said pin bosses on either side of said pin bores, said bottom wall extending circumferentially between said pin bosses but being interrupted across said hollowed regions of said pin bosses, said bottom wall including at least two openings that are arranged on opposite sides of said pin bosses, said openings being spaced radially from said outer annular ring belt wall and from said inner annular wall, said openings being oblong and extending circumferentially along a length sufficient to render said oil gallery more open than closed in the circumferential direction across said bottom wall between said pin bosses; said outer annular ring belt wall and said inner annular wall including radial ribs extending into said oil gallery and at least partially across said bottom wall; and a piston skirt, wherein said piston head, said pin bosses and said piston skirt are cast as a single piece of steel.

* * * * *